United States Patent [19]

Maycock

[11] 4,113,078
[45] Sep. 12, 1978

[54] DRIVEN PLATES FOR FRICTION CLUTCHES

[75] Inventor: Ian Commander Maycock, Leamington Spa, England

[73] Assignee: Automotive Products Limited, Leamington Spa, England

[21] Appl. No.: 797,768

[22] Filed: May 17, 1977

[30] Foreign Application Priority Data

May 20, 1976 [GB] United Kingdom ............... 20800/76

[51] Int. Cl.² ............................................. F16D 13/64
[52] U.S. Cl. ................................................ 192/107 C
[58] Field of Search ................................... 192/107 C

[56] References Cited

U.S. PATENT DOCUMENTS

| 2,283,113 | 5/1942 | Wemp | 192/107 C |
| 3,241,644 | 3/1966 | Ridenour | 192/107 C |
| 3,587,803 | 6/1971 | Sugiura | 192/107 C |

FOREIGN PATENT DOCUMENTS 890,309  11/1943  France ............................ 192/107 C Primary Examiner—Benjamin W. Wyche
Attorney, Agent, or Firm—Kemon & Estabrook

[57] ABSTRACT

A driven plate for a friction clutch of a vehicle and which includes a pair of annular friction facings carried on an inner portion of the driven plate by a plurality of resilient cushioning elements, attached to and disposed in a circumferential array around the inner portion of the driven plate. The friction facings are secured one on each side of the resilient cushioning elements so that the friction facings are held generally parallel to each other. The cushioning elements are fashioned so that when the driven plate in use, is clamped between a vehicle flywheel and pressure plate then the forces acting within each cushioning element are distributed such that the cushioning element provides a stiffer spring means between the outer peripheral portions of the friction facings than between the radially inner peripheral portions of the friction facings and this stiffer spring means decreases continuously across the width of the friction facing until it reaches a minimum at the radially inner periphery of the friction facings.

8 Claims, 8 Drawing Figures

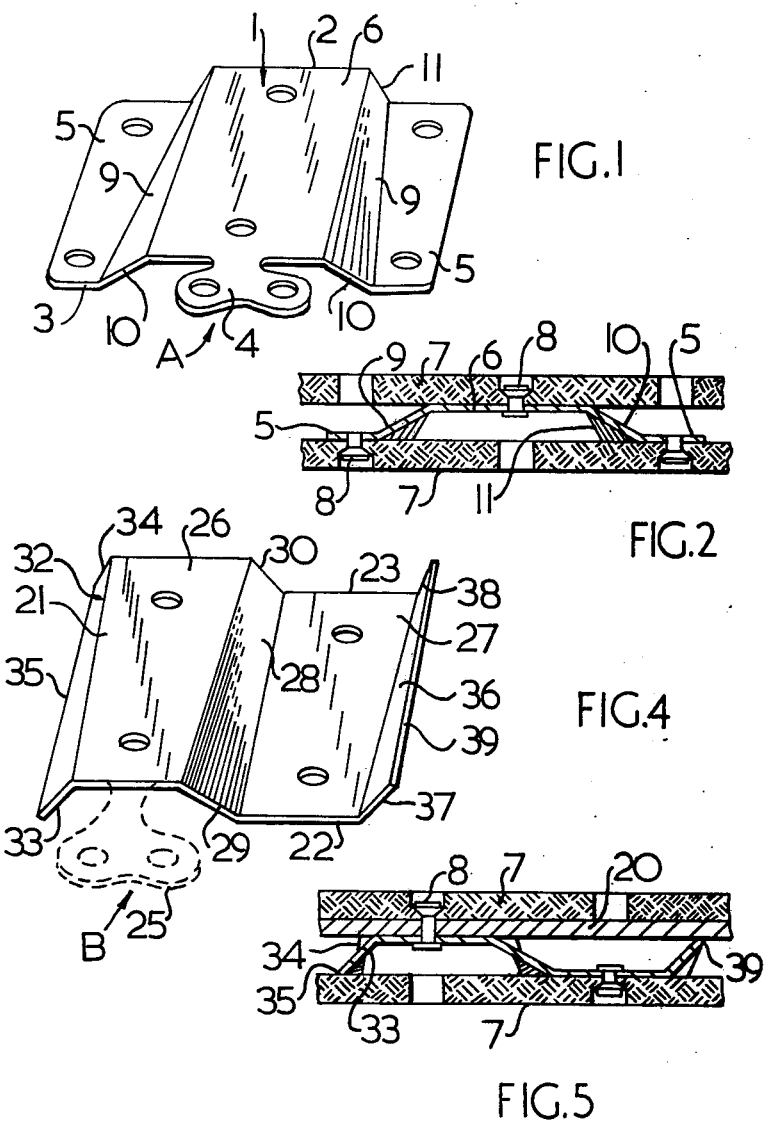

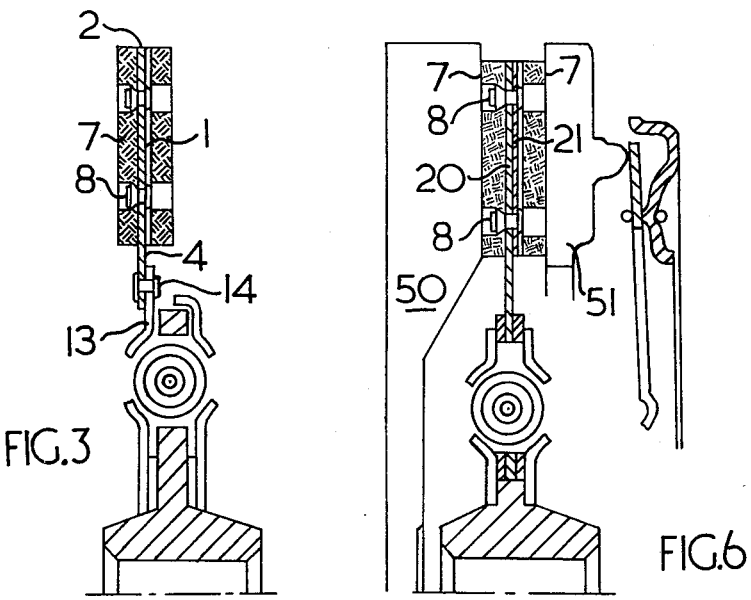
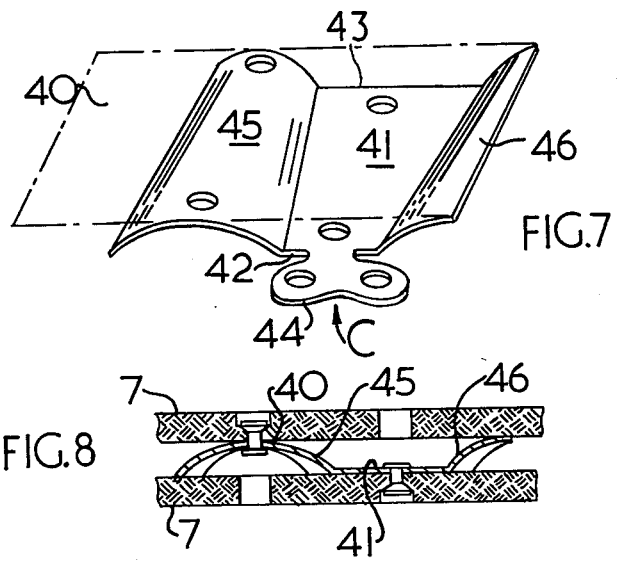

DRIVEN PLATES FOR FRICTION CLUTCHES

This invention relates to the driven plates of friction clutches of the type having spring means between the friction linings and being suitable for use in motor vehicles.

In order that motor vehicles may make gentle and smooth changes in transmission drive it is conventional for the friction facings on the clutch plate to have some resilience in the axial direction. The axial movements of the friction facings must be large enough to ensure a smooth engagement of the clutch.

One known solution to this type of clutch plate is for the friction facings to be held apart by performed spring cushion segments which are circumferentially disposed around a hub member. These spring cushion segments are designed to hold the friction facings flat when the clutch plate is firmly gripped between a vehicle flywheel and the pressure plate of the clutch. When the pressure is removed by operation of the clutch release mechanism the spring elements move the friction facings apart in an axial direction. The distance between the friction facings may be greater at the outer circumference than at the inner circumference. This is to ensure that when the drive is engaged the initial loads are taken on the larger areas of the outer circumference of the friction facing. However this difference in distance between the radially outer and inner portions of the friction facings places a strain on the inherently flat facings.

According to this invention there is provided a driven plate for a friction clutch of a vehicle and which includes a pair of annular friction facings carried on an inner portion of the driven plate by a plurality of resilient cushioning elements, disposed in circumferential array around the inner portion of the driven plate, and wherein the friction facings are disposed one each side of the resilient cushioning elements so that the friction facings are held generally parallel to each other, and the cushioning elements are fashioned so that when the driven plate, in use, is clamped between its driving members then the forces acting within each resilient cushioning element are distributed such that the cushioning element provides a stiffer spring means between the outer peripheral portions of the friction facings than between the radially inner peripheral portions of the friction facing and this stiffer spring means decreases continuously across the width of the friction facing until it reaches a minimum at the radially inner periphery of the friction facing.

Preferably the spring means provided by the cushioning elements between the friction facings comprises simple built-in beam type mechanisms acting between two parallel planes, the lesser spring means between the radially inner peripheries of the friction facings is achieved by having longer beams between the two parallel planes at this position than those complementary beams between the said planes at the radially outer peripheries of the friction facings, and there is a smooth continuous change in length between each beam on the radially inner periphery and its complementary beam on the radially outer periphery and these beams constitute a sloping wall acting between the two parallel planes such that the angle of inclination of the wall varies across the radial width of the cushioning element.

Conveniently there are two sloping walls acting between the two parallel planes.

Alternatively the spring means comprise one sloping wall acting between the two parallel plane portions of the cushioning element and the sloping wall is flanked on each side by a further sloping wall projecting from its parallel plane portion towards the other parallel plane such that the edge of the further sloping wall away from its parallel plane portion lies in the same plane as the other of the parallel plane portions.

Preferably the spring characteristic of each of the two further sloping walls are equal and each of the two is approximately equal to the spring characteristic of the sloping wall acting between the two planes.

The spring means between the friction facings may comprise arches, preferably parabolic arches, acting between two parallel planes, the less stiff spring between the radially inner peripheries of the friction facings is achieved by having an arch of greater span at this position than that complementary arch between said planes at the radially outer periphery, and there is a smooth continuous change in the span of the arch between the two extremes.

Also the arches may act in unison with a cantilever type semi arch wall which acts as a beam type mechanism.

In order that this invention may more readily be understood, reference will be made by way of example to the accompanying drawing in which:

FIG. 1 is an isometric view of a cushioning element according to this invention;

FIG. 2 is a view of FIG. 1 in the direction of arrow A with the friction facing now attached;

FIG. 3 is a cross-section through a typical clutch driven plate fitted with a cushion attached to the hub as in FIG. 1 and FIG. 2;

FIG. 4 is an isometric view of another cushioning element according to this invention;

FIG. 5 is a view of FIG. 4 in the direction of arrow B with the friction facings now attached, using a different construction than in FIG. 2;

FIG. 6 is a cross-section through a typical clutch driven plate, fitted with a cushion element attached to the hub as in FIG. 3 and FIG. 4;

FIG. 7 is an isometric view of another cushioning element according to the invention; and FIG. 8 is a view of FIG. 7 in the direction of arrow C with the friction facings now attached, using the same construction as in FIG. 1 and FIG. 2.

Referring to the drawings FIG. 1, FIG. 2 and FIG. 3, the cushioning element shown is made from preformed spring steel and comprises a segmental portion 1 having a radially outer edge 2 and a radially inner edge 3. The radially inner edge 3 carries a lug 4 extending radially inwards for attachment to a carrier disc 13 by rivets 14.

Alternatively the cushion segment as illustrated in FIG. 1 can comprise a segmental portion 1 only, having a radially outer edge 2 and a radially inner edge 3. The segmental portion does not carry a lug 4 but is mounted directly onto a carrier disc 20 (See FIG. 6). The friction facings 7 are attached, one to the carrier disc 20 and the other to the side of cushioning segment away from the carrier disc 20.

According to the invention the segmental portion 1 is formed to provide two parallel planes 5 and 6 to which the friction facing 7 are attached by rivets 8. The two parallel planes 5 and 6 are separated by two sloping support walls 9 which are of the form of built-in beams. The beams 10 are acting between the two parallel planes 5 and 6 on the radially inner edge 3 of the segmental portion 1 and represent the radially inner edges of the sloping walls 9. The beams 11 are acting between the two parallel planes 5 and 6 on the radially outer edge 2 of the segmental portion 1 and represent the radially outer edges of the sloping wall 9. The beams 10 are substantially longer than the beams 11, such that if equal loads were applied to each of the edges 2 and 3 then the edge 3 would collapse under the load before the edge 2. There is a smooth progression across the width of the segmental portion 1 from each of the longer beams 10 on the radially inner edge 3 to its complementary shorter beam 11 on the radially outer edge 2. This smooth transition in the length of the beams from the longer radially inner beam 10 to the shorter radially outer beam 11 constitutes each of the sloping side walls 9 such that the angle of inclination of the wall 9 to each of the two parallel planes 5 and 6 varies across the width of the segment.

When a driven plate manufactured with this type of cushioning element is mounted between a vehicle flywheel 50 and a clutch pressure plate 51 (see FIG. 6) and the clutch is engaged, the load applied to the friction facing in an axial direction will be taken over the whole of the friction facing. Since the beams 10 on the inner edge 3 are longer than the beams 11 on the radially outer edge 2, the cushioning element will begin to collapse at its radially inner edge 3 thus ensuring that the initial load upon engagement of the clutch will be taken on the radially outer portions of the clutch facing. The continuous transition across the radial width of the segment 1 from long to short beams as is constituted by the walls 9 will ensure a smooth take up of the axial load by the cushioning elements.

With reference to FIG. 4, FIG. 5 and FIG. 6, the cushion element shown is similar in principle to the cushioning element shown in FIG. 1, and comprises a segmental portion 21 with a radially inner edge 22 and radially outer edge 23. The segment is attached by rivets 8 onto a carrier disc 20 as shown in FIG. 5 and FIG. 6.

Alternatively, the radially inner edge 22 may carry a lug 25 for attachment to a carrier disc 13, similar to that shown in FIG. 3.

The segmental portion 21 provides two parallel planes 26 and 27 which are separated by a sloping wall 28 which is of the form of a simple built-in beam, acting between the parallel planes 26 and 27. The beam 29, acting between the two parallel planes 26 and 27 on the radially inner edge 22 of the segmental portion 21, is represented by the radially inner edge of the wall 28. The beam 30 is between the two parallel planes 26 and 27 on the radially outer edge 23 and is represented by the radially outer edge of the wall 28, and the beam 29 is substantially longer than the beam 30. There is a smooth progression across the width of the segment from a longer beam 29 to a shorter beam 30, as constituted by the sloping wall 28.

The side of the plane 26 opposite the sloping wall 28 is bounded by an inclined cantilevered wall 32, which forms a simple cantilever beam mechanism which runs across the width of the segment 21. The length of the cantilever beam 33 on the radially inner edge 22 of the segmental portion 21 is greater than and progressively shortens to the length of the cantilever beam 34 on the radially outer edge 23 of the segmented portion 21. The edge 35 of the wall 32 away from the plane 26 is in the same plane as the plane 27.

Similarly, the plane 27 is bounded by an inclined cantilever wall 36 which runs across the width of the segmental portion 21. The length of the cantilever beam 37 on the radially inner edge 22 is greater than the length of the cantilever beam 38 on the radially outer edge 23. There is a smooth progression between the two extremes across the width of the segment. The edge 39 of the cantilever wall 36 away from the plane 37 is in the same plane as the plane 26.

The two cantilever walls 32 and 36 are of the same dimensions and are kept in the correct proportions with the built-in beam wall 28 so as to ensure an even circumferential distribution of load around the friction facings.

The cushion element functions in a similar manner to that illustrated in FIG. 1.

The beam 29 and cantilevers 33 and 37 on the radially inner edge of the sloping walls 28, 32 and 36 respectively are longer than their complementary beam 30, and cantilevers 34 and 38 respectively on the radially outer edge of the sloping walls 28, 32, and 36 respectively. Hence the inner edge of the cushioning element will collapse under load before the radially outer edge.

FIGS. 7 and 8 illustrate another type of cushioning element according to this invention.

In this cushioning element the load resisting means are arches, preferably parabollic arches. A plane segment 41 has a radially inner edge 42 and a radially outer edge 43. The radially inner edge 42 carries a lug 44 for attachment to a hub member. Alternatively the cushioning element carries no lug and is secured to a carrier disc as in FIG. 4, FIG. 5 and FIG. 6.

The plane 41 is bounded on the one side by an integral elongated parabollic arch 45 and on the other side by an integral cantilever beam wall 46 which is of the form of a half parabolla. The apexes of the elongated arch 45 and the cantilever wall 46 define a second plane 40.

The arch and cantilever formed on the radially inner edge 42 have a lower load bearing capacity than their complementary members on the outer radially edge 43. There being a smooth progression across the segment between the two extremes.

The friction facings 7 are carried by the plane 41 on one side of the cushioning element and are held in the plane 40 by the apexes of the arch 45 and cantilever 46 on the second side of the cushioning element.

The elongated arch 45 and cantilever wall 46 are proportioned so as to give an even distribution of load over the circumference of the friction facings.

The cushioning element functions in the same manner as the elements in FIG. 1 and FIG. 3. The inner edge 42 of the cushioning element is designed to collapse before the outer edge 43 of the cushioning element, so that when a clutch driven plate using these cushioning elements is mounted between a vehicle flywheel (50) and a clutch pressure plate (51) excess loads are taken on the radially outer circumferential portion of the friction facings.

In either construction, illustrated in FIG. 1, 4 and 7, the variation in load over the width of the friction facings caused by the variable load characteristics of the cushioning mechanism, may be made sufficient to compensate for the larger outer circumferential area of the facings and give a uniform clamping pressure between the inner and outer peripheries of the friction facings.

Alternatively, the variation in load may be adjusted so as to give a greater clamping pressure at the outer periphery than at the inner periphery of the friction facings.

There will be a tendency for the outer periphery of the facings to wear away faster than the inner edge and this wear will tend to reduce the increased clamp load at the outer periphery of the friction facing. However the increased clamping load at the outer periphery will be present as a new clutch driven plate is bedding in and that is the stage at which load distribution over the friction facing is most critical.

I claim:

1. A driven plate for a friction clutch of a vehicle comprising:

a hub member;

an annular plate member connected to and disposed around the hub member;

a plurality of resilient cushioning elements secured to and in circumferential array around the plate member;

and a pair of annular friction facings attached one either side to the resilient cushioning elements so that the friction friction facings are held generally parallel to each other and the two opposing back faces of the friction facings which are adjacent the resilient cushioning elements define two parallel faces;

wherein each cushioning element comprises:

at least one generally circumferentially extending operative resilient portion which extends between two parallel abutment surfaces associated with the parallel back faces of the friction facings and which tapers from a greater width at its radially inner end to a smaller width at its radially outer end.

2. A driven plate for a friction clutch as claimed in claim 1, wherein the operative resilient portion of the cushioning element acting between the associated back faces of the friction facings comprises:

a sloping wall acting between two parallel portions of the resilient cushioning element which are secured one against each of the parallel abutment surfaces such that the angle of inclination of the wall varies across the radial width of the cushioning element.

3. A driven plate for a friction clutch as claimed in claim 2, wherein there are two sloping walls acting between the two parallel portions of the cushioning element.

4. A driven plate for a friction clutch as claimed in claim 2, wherein there is one sloping wall acting between the two parallel portions of the cushioning element and the sloping wall is flanked on each side by a further sloping wall projecting from its parallel portion towards the other parallel abutment surface such that the edge of the further wall away from its parallel portion lies in the same plane as the other of the parallel abutment surfaces.

5. A driven plate for a friction clutch as claimed in claim 4, wherein the spring characteristic of each of the two further sloping walls is approximately equal to the spring characteristic of said one sloping wall.

6. A driven plate for a friction clutch as claimed in claim 1, wherein the operative resilient portion of the cushioning element acting between the parallel abutment surfaces comprises an arch acting between the two parallel abutment surfaces and the arch has a greater span at the radially inner edge of the cushioning element than at the radially outer edge of the cushioning element and there is a smooth continuous change in the span of the arch between the two aforementioned edges.

7. A driven plate for a friction clutch as claimed in claim 6, wherein the arch is a parabollic arch.

8. A driven plate for a friction clutch as claimed in claim 7, wherein the operative resilient portion of the cushioning element comprises the arch integral on one radial side with a planar portion for attachment against abutment surface, and the planar portion is defined on its other radial side by a cantilever semi-arch wall which projects from the said portion towards the other parallel abutment surface.

* * * * *